Oct. 2, 1945.   G. M. GARY   2,385,982
AUTOMOBILE CONTROLS
Filed Sept. 29, 1943   2 Sheets-Sheet 1
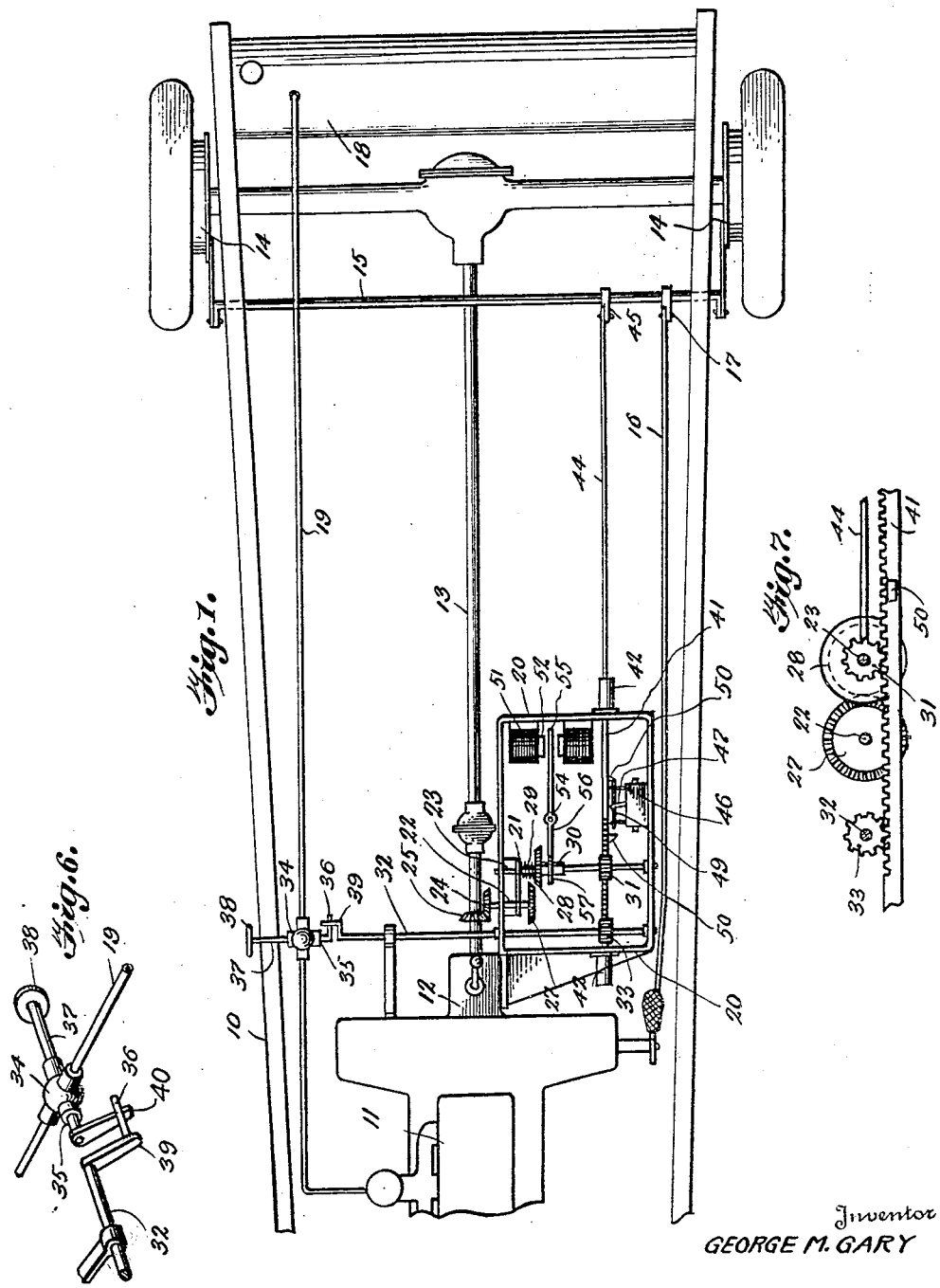
Inventor
GEORGE M. GARY
By Wilfred E. Lawson
Attorney

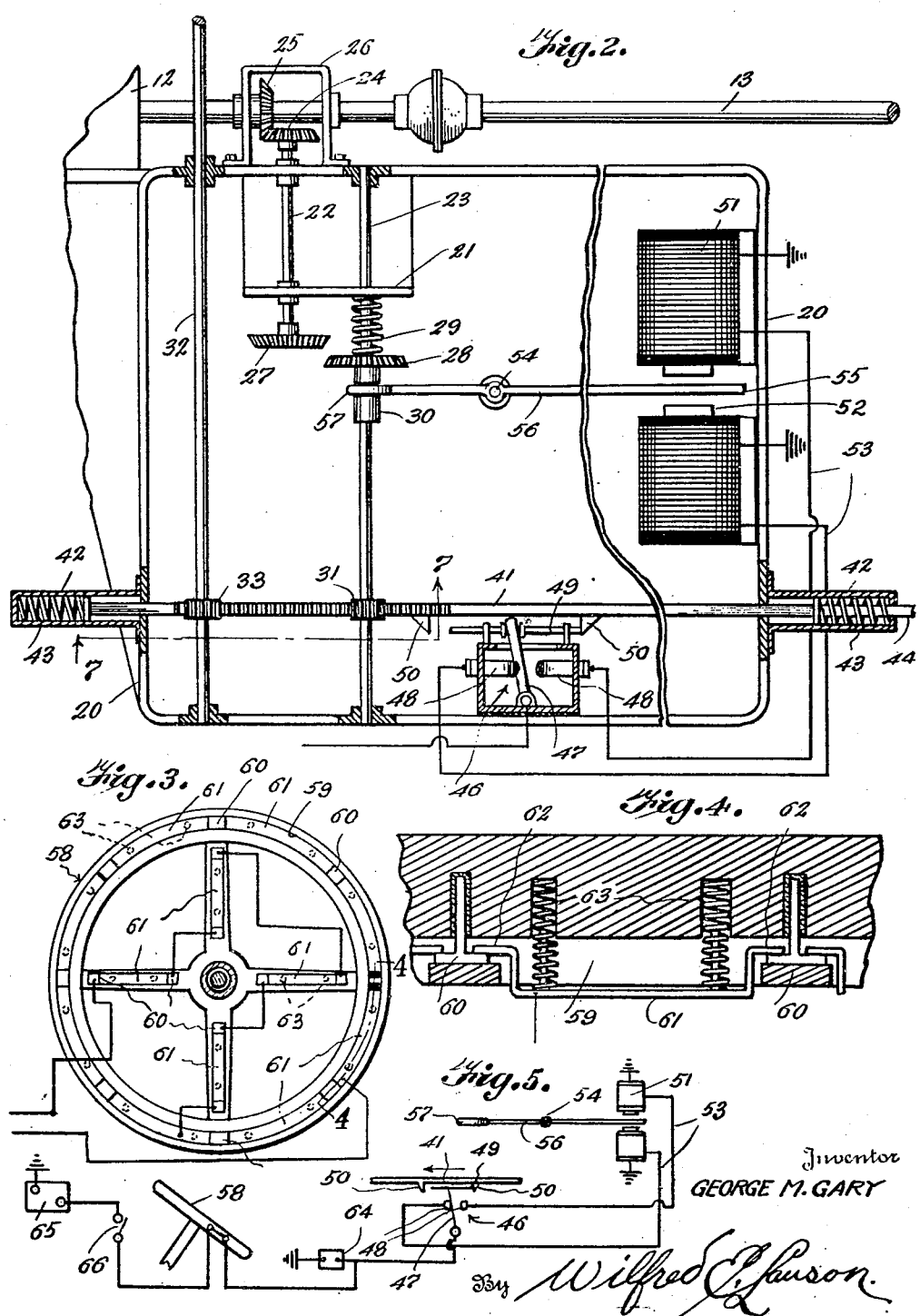

Patented Oct. 2, 1945

2,385,982

UNITED STATES PATENT OFFICE 2,385,982

AUTOMOBILE CONTROL

George M. Gary, San Diego, Calif.

Application September 29, 1943, Serial No. 504,323

4 Claims. (Cl. 180—82)

This invention relates generally to motor vehicle control mechanism and pertains particularly to a control mechanism which is designed to function automatically and effect the stopping of the motor vehicle, in the event that the driver loses control thereof for any reason such as sleepiness, a heart attack or from intoxication or for any other reason.

A principal object of the invention is to provide a safety mechanism for a motor vehicle which functions as soon as the operator of the vehicle relaxes his grip upon the steering wheel, to apply the brakes and to shut off the supply of fuel to the vehicle motor.

Another object of the invention is to provide a safety mechanism for a motor vehicle, designed to effect the complete and prompt stopping of the vehicle if the operator thereof should relax his hold upon the steering wheel, by the transmission of power from the propeller shaft of the motor vehicle to the brakes to effect the applying thereof and to a control unit for shutting off the flow of gasoline to the motor, such power being taken from the propeller shaft behind the transmission so that if the vehicle continues to move out of control after the motor has stopped the application of the brakes will still be effected.

A further object of the invention is to provide in a motor vehicle safety control mechanism of the above described character, a means whereby the brakes will be applied and released intermittently until the vehicle has been brought to a full stop so that, if the vehicle happens to be moving at a high rate of speed when the driver loses control thereof, there will be no danger to the occupants of the vehicle through the sudden application of the brakes.

Still another object of the invention is to provide in a motor vehicle safety control mechanism of the character stated, a means for indicating audibly when the driver has relaxed his grip upon the steering wheel of the vehicle so that the driver will be warned or, if the driver is unconscious, the occupants of the vehicle will be warned of the state of affairs and may take whatever measures may be considered appropriate for their safety.

The invention will be best understood from a consideration of the following detailed description taken in connection with the accompanying drawings, with the understanding that minor changes or alterations may be made in the mechanism without departing from the spirit of the invention, so long as such changes or alterations do not depart from the scope of the invention as expressed in the appended claims.

In the drawings—

Figure 1 shows in plan a portion of the chassis of a motor vehicle showing the application thereto of the control mechanism constituting the present invention.

Figure 2 is a view partly in plan and partly in section, on an enlarged scale, of the control mechanism as illustrated in Figure 1 minus the fuel control valve and actuating means therefor.

Figure 3 is a diagrammatic view illustrating the electric circuit control means upon the steering wheel.

Figure 4 is a detail section taken on the line 4—4 of Figure 3.

Figure 5 is a circuit diagram for the control mechanism.

Figure 6 is a view in perspective of the fuel line control valve and actuating means therefor.

Figure 7 is a sectional view taken substantially upon the line 7—7 of Figure 2.

Referring now more particularly to the drawings the invention is illustrated in plan in Figure 1 in association with a conventionally shown or illustrated motor vehicle chassis which is designated 10 and those parts carried by the chassis which must be referred to in order to set forth a clear understanding of the invention and its operation.

The motor is indicated at 11, the transmission housing at 12 and the drive or propeller shaft at 13, the latter running to the rear axle in the usual manner and the outer ends of the axle being encircled by the usual brake apparatus 14.

The numeral 15 designates a brake-bar which is rockably supported upon the chassis in accordance with certain forms of motor vehicle brake mechanism, such rock-shaft being actuated by a foot brake rod 16 which is connected at its rear end to the lever 17 which in turn is attached to the beam 15.

The numeral 18 designates the fuel tank for the vehicle and the numeral 19 designates the pipeline leading from the fuel tank to the engine fuel pump and carburetor, etc., not illustrated.

In accordance with the present invention there is mounted upon the chassis or upon the rear of the transmission-housing 12, a suitable gear casing 20 in which is mounted the bearing post 21 which supports two horizontally disposed, spaced parallel shafts 22 and 23.

The shaft 22 extends through the inner side wall of the gear casing 20 toward the drive-shaft 13 and carries upon its inner end, by which is meant the end nearest the drive-shaft 13, a gear 24, which may be of the bevel type.

The gear 24 which is carried by the short or stub shaft 22, is in mesh or permanently operatively coupled with a corresponding gear 25 which is carried upon the drive or propeller shaft. If desired a suitable housing or enclosure may be provided for these gears 24—25, such enclosure being designated 26.

On the stub shaft 22 and within the casing 20, a bevel or miter gear 27 is mounted and adjacent to this gear 27 there is mounted upon the adjacent or associate shaft 23, a corresponding bevel gear 28.

The bevel gear 28 is keyed to the shaft 23 to have limited sliding movement thereon and a means is provided, in the form of a spring 29, for constantly urging the gear 28 to move axially out of engagement with the adjacent gear 27.

Upon the opposite side of the movable gear 28 from the control spring 29, this gear has associated therewith a shift yoke collar 30.

The shaft 23 is rotatably supported in the outer side wall of the casing 20 and adjacent this outer side wall of the casing there is mounted upon and secured to the shaft 23, a spur gear 31.

Extending transversely of the chassis and through the gear casing 20, is a fuel line valve actuating shaft 32, suitable bearings being provided in the opposite side walls of the casing 20 for the steady support of this shaft.

Within the gear casing 20 the valve actuating shaft 32 carries a spur gear 33 which is in substantially the same plane as the gear 31, the axes of rotation of these gears being parallel.

The numeral 34 designates a valve in the gasoline or fuel line 19. This valve is provided with a control stem having an inner portion 35 terminating in a laterally extending finger 36, and an outer portion 37 having a suitable lever means in the form of a wheel 38 or the like by which the stem may be turned from the outer side of the chassis for the purpose of opening the valve when desired.

The shaft 32 is aligned with the control stem of the valve 34 and terminates at one end in close proximity to the portion 35 of the valve stem where it carries an L shaped finger 39, the short lateral extension 40 of which is so positioned that when the shaft 32 is rotated such extension will move around in the path of rotation of the finger 36 of the valve stem to engage such finger and turn the valve in the desired direction to effect the closing of the valve.

Extending longitudinally of the chassis through the gear casing 20 and through the front and rear walls thereof, is a toothed bar or rack bar 41. The ends of this bar are mounted in suitable bearings to permit the smooth longitudinal movement of the bar back and forth and upon the outer side of each of the front and rear walls, there is mounted a tubular housing 42 which receives the adjacent end of the rack bar 41.

Each of the tubular housings 42 encloses a tension spring 43 which is suitably operatively coupled between the adjacent end of the rack bar and the adjacent wall of the casing to resist the movement of the rack bar out of a prescribed position. The springs 43 oppose one another so that the rack bar is constantly maintained, when the mechanism is not operating, in a position with respect to the gears 31 and 33 where power may be readily transmitted through the gear 31 from the shaft 23 to the bar to shift it in one direction and such power transferred from the bar to the gear 33 to rotate the shaft 32.

While the forward end of the rack bar is completely enclosed in the spring casing 42, the rear end of this bar has operative connection through a suitable coupling means such as a cable or rod 44, with an actuating lever 45 carried by the brake beam 15 so that when the toothed bar or rack 41 is moved forwardly the brake beam 15 will be rocked to apply the brakes.

Mounted within the casing 20 in a suitable manner adjacent the rack bar 41 is a two-way or single pole, double throw switch indicated generally by the numeral 46 and having the movable or center contact 47 and the opposite fixed contacts 48 with one or the other of which the movable contact 47 is adapted to engage when shifted in either direction from its central or neutral position.

Connected with the movable center contact 47 of the two-way switch, is a stem 49 which may be of any suitable character or in any manner suitably arranged to be engaged by the spaced fixed stops 50 which are carried by the rack bar and between which the stem 49 is disposed.

Mounted within the casing 20 are two opposed electro-magnets 51, the spaced cores of which are indicated at 52. Each of these magnets is grounded upon one side and is connected at its other side by a wire 53 with one of fixed terminals 48 of the control switch 46.

Mounted within the casing 20 upon a pivot 54 which is disposed in a plane passing midway between the magnet cores 52, is an oscillating armature 55 which carries a yoke arm 56 which terminates in the yoke 57 which is operatively engaged with the sliding gear collar 30. Spring 29 is tensioned so that when the two magnets are deenergized it will shift the sliding gear 28 so as to center the armature 55 between the magnet core and in such position the gear 28 will be out of connection with the gear 27. When one of the magnets 51 is energized so as to attract the armature 55 the gear 28 will be shoved over on the shaft 23, against the tension of spring 29, into toothed connection with the gear 27 so as to operatively couple the gears 22 and 23 for the transmission of power from the propeller shaft 13 to the gear 31 and when the other magnet is energized the armature will be oppositely attracted so as to disengage the gear 28 from the gear 27 such movement being assisted by the tensioned spring 29.

The motor vehicle steering wheel is generally indicated by the reference numeral 58 and is provided in its under side with a channel 59 in which is mounted a plurality of spaced switch terminals 60 and, between these spaced terminals the elongated shiftable current conductors 6 which are adapted to bridge the space between two adjacent terminals 60 to carry the current across from one terminal to the other. These conductors have the angled inset end portion 62 which engage under the fixed terminals 60 and limit the outward movement of the shiftable conductor in addition to forming the desired electrical connection with the fixed terminal Such outward movement of the shiftable conductor is urged by springs 63 interposed between the shiftable conductors and the body of the steering wheel as illustrated in Figure 4. These shiftable conductors form a plurality of means of breaking an electric circuit in which is connected the control switch 46 and a buzzer or other sound making means, which is indicated generally b the numeral 64. As shown these units are connected in series with the vehicle battery 65, through the ignition switch 66.

The present safety control device will not operate to set the vehicle brakes or to close the fuel line valve 34 unless the vehicle is in motion, consequently when the operator turns on the ignition switch no part of the apparatus will function except the sounding device 64 and this will be shut off as soon as the operator grips the steering wheel so as to depress one of the shiftable conductors 61 of the steering wheel switch. The normal position of the valve 34 is open and the normal relation of the gears 27 and 28 is separated and the springs 43 will keep the rack bar 41 in a position where the brake lever 45 will be off.

If during the operation of the vehicle the driver should for any reason whatever relax his hold upon the steering wheel so as to close the steering wheel switch the circuit to the sounding signal 64 will be closed thus notifying the driver or other persons in the vehicle that the driver has relaxed his grip upon the steering wheel. The circuit through one of the magnets will also be closed by reason of the fact that the steering wheel switch has been allowed to close and the control switch remains in closed position with regard to the said one of the magnets, the said one of the magnets being that one which, when energized, will oscillate the armature 55 in a direction to shift the gear 28 into toothed connection with the gear 27. When this occurs rotatory motion will be transmitted from the constantly turning shaft 22 which is operatively coupled with the drive shaft 13, through the shaft 23 to the gear 31 which will effect the forward movement of the rack bar. This will apply the brakes and will at the same time rotate the gear 33 and the shaft 32 connected therewith so as to turn the finger 40 into connection with the valve stem finger 36 for the rotation of the valve stem in a desired direction to close the valve. This will shut off the flow of fuel to the vehicle engine, effecting the stoppage thereof. The continued forward movement of the rack bar will continue before the brakes are completely or tightly applied, to bring one of the switch actuating lugs 50 into engagement with the switch element 49 to effect the movement of the shiftable contact of the switch over to electrical engagement with the other fixed terminal. Thus the magnet which had been energized and which oscillated the armature in the direction to shift the gear 28 into connection with the gear 27, will be de-energized and the opposing magnet will be energized so as to oppositely move the armature and shift the gear 28 back out of engagement with gear 27. As soon as this driving connection is broken the springs 43 will shift the rack bar 41 back to its original position thereby relaxing or releasing the brakes and returning the shiftable contact of the switch 46 into electrical engagement with that fixed contact with which it was first connected so as to re-energize the originally energized magnet. By this means the gears 27 and 28 will again be brought together and if the vehicle is still moving the necessary power will be transmitted through the drive shaft 13 to again move the rack 41 forwardly and again apply the brakes. This alternate energization of the two magnets will continue so as to alternately apply and release the brakes, until the vehicle has been brought to a stand-still, the fuel line switch 34 meanwhile remaining closed.

When it is again desired to start up the vehicle the valve 34 can be opened by means of the hand wheel or lever 38 and, although the gears 27 and 28 will remain connected together or, if not connected, will be re-connected when the ignition switch is turned on, they will become disconnected as soon as the circuit is opened by the grasping of the steering wheel since the controlling magnet will then be de-energized and the spring 29 will shift the gear 28 back until the armature 55 is centered between the two magnets.

I claim:

1. In a motor vehicle having brakes, a drive shaft, a fuel line valve and a steering wheel; a safety control mechanism comprising a gear operatively connected with the drive shaft, a power shaft, a gear keyed to and slidable on the power shaft for operative connection with the first gear, a reciprocable brake actuator, a continuous driving connection between said shaft and said actuator, means for effecting the closing of said valve, a continuous driving connection between said means and the power shaft, an electrical shifting means operatively connected with said sliding gear for effecting the movement of the sliding gear into connection with the adjacent first mentioned gear, control means carried by the steering wheel for governing the energization of said electrical shifting means, said electrical shifting means including an electrical element which when energized functions to effect the disconnection of said gears, a reversing switch controlling the flow of electric current to said electrical means, and means actuated by said power shaft for operating said control switch to effect the flow of current alternately to the electrical shifting means whereby the power shaft will be intermittently operated.

2. In a motor vehicle having a drive shaft, brakes, a fuel supply line and a steering wheel, a safety control mechanism comprising a power take off shaft connected with the drive shaft, a gear carried by the power take off shaft, a driven shaft rotatably supported adjacent the power take off shaft, a gear keyed to the driven shaft and slidable thereon relative to the first gear, a control valve for said fuel line having a control stem, a valve actuating shaft having an end disposed adjacent said stem, means carried by the last mentioned shaft for engaging and turning the stem when the last mentioned shaft is rotated in one direction, a rack bar disposed transversely of the driven shaft and the valve control shaft and having operative connection with said brakes, a gear means connecting the rack bar with the driven shaft and valve shaft whereby rotary motion imparted to the driven shaft from the power take off shaft will effect the movement of the rack bar in a direction to apply said brakes and to turn the valve shaft for the shutting off of the valve, electrical control mechanism under operative control from said steering wheel for effecting driving connection between the shiftable gear and the first gear, said electrical control mechanism comprising a pair of opposed electro-magnets, an armature common to said magnets and mounted for movement by each magnet when the magnet is energized, means connecting the armature with the sliding gear whereby movement of the armature by one magnet will effect engagement of the sliding gear with the first gear and movement of the armature by the other magnet will effect disengagement of the sliding gear from the first gear, and means actuated by the rack bar upon forward and rearward movement thereof for causing alternate energization of the magnets.

3. An electrically controlled power take off mechanism for operation by a power shaft, comprising a power take off shaft operatively coupled with the power shaft and having a gear operatively connected therewith, a driven shaft operatively connected therewith, a driven shaft disposed adjacent said power take off shaft, a work transmitting member operatively coupled with the driven shaft to be actuated thereby, a sliding gear mounted upon the driven shaft and adapted to be moved into operative connection with the first gear, an electro-magnet, an armature for said electro-magnet having operative connection with said sliding gear, said electro-magnet when energized moving the armature to shift the sliding gear into operative connection with the first gear, means for reversely moving the sliding gear, said work transmitting member comprising a toothed rack, a gear connecting the rack with the driven shaft, a switch means controlling the flow of electric current to said magnet, and means carried by the rack for actuating said switch to shut off the flow of energizing current for the magnet to permit the reverse movement of the sliding gear.

4. Apparatus for taking off power from a power shaft, comprising a rotatable take off shaft operatively coupled with the power shaft, a gear carried by the take off shaft, a driven shaft supported adjacent said take off shaft, a gear keyed to and slidable on the driven shaft for operative connection with the first gear, a pair of opposed electro-magnets, an armature common to said magnets and mounted for movement relative to each magnet, an operative connection between the armature and the sliding gear whereby the armature when moved by one magnet will shift the sliding gear into connection with the first gear and when moved by the second magnet will shift the sliding gear out of connection with the first gear, means for controlling the flow of energizing current to said magnets, a reciprocable toothed rack bar, a gear connection between the rack bar and the driven shaft, and spring means connected with said rack bar and opposing the movement of the rack bar in one direction by the driven shaft, said spring means returning the rack bar to a predetermined position upon disengagement of the sliding gear from the first gear.

GEORGE M. GARY.